United States Patent
Iguchi et al.

(10) Patent No.: US 6,686,411 B2
(45) Date of Patent: Feb. 3, 2004

(54) VINYL CHLORIDE RESIN COMPOSITION

(75) Inventors: Hirokazu Iguchi, Hyogo (JP); Nobumasa Nakajima, Hyogo (JP); Koji Yui, Hyogo (JP); Mamoru Kadokura, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,651

(22) PCT Filed: Mar. 30, 2001

(86) PCT No.: PCT/JP01/02757

§ 371 (c)(1), (2), (4) Date: Apr. 9, 2002

(87) PCT Pub. No.: WO01/72896

PCT Pub. Date: Oct. 4, 2001

(65) Prior Publication Data

US 2002/0165311 A1 Nov. 7, 2002

(30) Foreign Application Priority Data

Mar. 31, 2000 (JP) .......... 2000-098519

(51) Int. Cl.⁷ .......... C08L 27/06; C08L 51/04
(52) U.S. Cl. .......... 524/500; 524/502; 524/501; 524/504; 525/71
(58) Field of Search .......... 525/71; 524/500, 524/501, 502, 504

(56) References Cited

U.S. PATENT DOCUMENTS

| | | |
|---|---|---|
| 3,996,173 A | 12/1976 | Heichele et al. |
| 4,520,166 A | 5/1985 | Kamada et al. .......... 525/85 |
| 4,542,185 A | 9/1985 | Meunier .......... 525/70 |
| 5,362,790 A | 11/1994 | Gloesener .......... 524/425 |

FOREIGN PATENT DOCUMENTS

| | | |
|---|---|---|
| EP | 1 160 282 A1 | 12/2001 |
| JP | 6-192534 | 7/1994 |
| JP | 10-36606 | 2/1998 |
| JP | 11-279353 | 10/1999 |

OTHER PUBLICATIONS

Derwent Abstract Accession No. 85–273758/44, JP 60–186536A (abstract only).
Derwent Abstract Accession No. 85–273722/44, JP 60–186552A (abstract only).
Derwent Abstract Accession No. 85–273774/44, JP 60–186554A (abstract only).
Derwent Abstract Accession No. 85–267517/43, JP 60–181152A (abstract only).
Derwent Abstract Accession No. 76–19918X/11, JP 51–012849A (abstract only).
Derwent Abstract Accession No. 85–265850/43, JP 60–177063A (abstract only).
Derwent Abstract Accession No. 2000–177109, JP 2000–026686A (abstract only).
Derwent Abstract Accession No. 93–208920, JP 5–132600A (abstract only).
Derwent Abstract Accession No. 92–255718/31, JP 4–173818A (abstract only).
Japanese Patent Abstract No. 10–036606 A, Feb. 10, 1998 (abstract only).
Japanese Patent Abstract No. 6–192534 A, Jul. 12, 1994 (abstract only).

Primary Examiner—Jeffrey Mullis
(74) Attorney, Agent, or Firm—Armstrong, Kratz, Quintos Hanson & Brooks, LLP

(57) ABSTRACT

The present invention provides a vinyl chloride-based resin composition which is highly excellent in weatherability, impact resistance and gloss is provided, which comprises:

(A) 100 parts by weight of a vinyl chloride-based resin;

(B) from 1 to 30 parts by weight of a graft copolymer which is obtained by graft-polymerizing;

(C) from 0.1 to 5 parts by weight of a methyl methacrylate-based two stages polymer which is obtained by, in the presence of a polymer while a solution of 0.1 g of said polymer in 100 ml of chloroform showing a specific viscosity ($\eta_{sp}$) of 0.7 or more at 30° C., comprising from 0 to 50% by weight of a repeating unit derived from methyl methacrylate, while a solution of 0.1 g of said two stages polymer in 100 ml of chloroform showing a specific viscosity of 0.5 or more at 30° C.; and (D) from 1 to 20 parts by weight of calcium carbonate.

6 Claims, No Drawings

VINYL CHLORIDE RESIN COMPOSITION

FIELD OF THE ART

This invention relates to a vinyl chloride-based resin composition which is highly excellent in weatherability, impact resistance, gloss and extrusion molding properties.

BACKGROUND ART

Because of having a low price and favorable mechanical and chemical properties, molded articles made of vinyl chloride-based resins have been widely used in various fields. However, these products have some disadvantages such that having only insufficient impact resistance, having a processing temperature close to the thermal decomposition temperature and thus being moldable only within a narrow temperature range, and taking a long time to achieve the molten state.

To solve the problem of having the insufficient impact resistance, a number of methods have been pointed out hitherto. Among all, it has been a common practice to use MBS resins and ABS resins obtained by graft-copolymerizing butadiene rubber-based polymers with methyl methacrylate, styrene or acrylonitrile.

Although the impact resistance can be improved by blending these MBS resins and ABS resins with vinyl chloride-based resins, the weatherability is deteriorated, and there arises a problem that the thus produced molded articles show considerably worsened impact resistance when used outdoors. Accordingly, it is proposed to improved the weatherability of the MBS resins and impart a good impact resistance thereto by graft-polymerizing an alkyl acrylate rubber-based polymer free from any double bonds with methyl methacrylate, an aromatic vinyl compound and an unsaturated nitrile (JP-B-51-28117 and JP-B-57-8827; the term "JP-B" as used herein means an "examined Japanese patent publication").

In case of using the graft copolymer obtained by this method, the molded vinyl chloride-based resin articles thus produced have an excellent weatherability and, therefore, appropriately usable in the field of constructional materials with a need for a long-lasting weatherability such as window frames and siding sheets.

As a technique for improving the processability of these vinyl chloride-based resins, it is proposed to add form about 0.5 to 5% of a copolymer containing a repeating unit derived from methyl methacrylate as the main component as a processing aid (JP-B-52-49020). Generally, by using this processing aid in the extrusion molding of window frames or siding sheets, the gelation of the vinyl chloride-based resin is promoted and thus favorable molded articles can be obtained.

Some of the vinyl chloride-based resin compositions for the field of constructional materials contain calcium carbonate or titanium oxide as a filler. Among all, calcium carbonate has been widely employed since it is not only less expensive and thus exerts a cost-down effect but also contributes to the elevation of the heat deforming temperature, the improvement in insulating resistance and the improvement in the dimensional stability. In case of, for example, window frames, it is needed to produce molded articles having smooth and glossy surface, but no method has been developed hitherto to meet the needs for improving the gloss. That is to say, although the gloss is improved by using a large amount of the processing aid, the effect of improving the gloss is still insufficient and, moreover, there arises another problem of the worsening of the impact resistance. Although the gloss can be improved by reducing the content of calcium carbonate, this method is undesirable since it results in an increase in the cost. Although improved gloss can be obtained by elevating the molding temperature, there arise some problems in this case, for example, a decrease in the discharge due to an increase in the extrusion torque and the occurrence of the heat decomposition of vinyl chloride. Accordingly, it is very difficult to simultaneously achieve a favorable gloss, a high impact resistance, a high productivity and a low cost.

SUMMARY OF THE INVENTION

The invention, which has been made by taking the problems encountering in the conventional art into consideration, aims at providing a vinyl chloride-based resin composition from which highly glossy molded articles with favorable surface properties can be obtained without worsening the impact resistance.

The inventors have conducted intensive studies to solve the problems as described above. As a result, they have found out that highly glossy molded articles can be obtained without worsening the impact resistance by using a hard polymer containing an acrylate rubber-based graft copolymer and a repeating unit derived from methyl methacrylate with an extremely high molecular weight as the main components.

Accordingly, the present invention provides the following vinyl chloride-based resin composition which can achieve the object mentioned above.

1. A vinyl chloride-based resin composition which comprises:

(A) 100 parts by weight of a vinyl chloride-based resin;

(B) from 1 to 30 parts by weight of a graft copolymer which is obtained by graft-polymerizing, in the presence of from 70 to 95 parts by weight of a crosslinked acrylic rubber-like polymer (b-1), from 5 to 30 parts by weight of a vinyl monomer (b-2) while controlling the sum of (b-1) and (b-2) to 100 parts by weight;

(C) from 0.1 to 5 parts by weight of a methyl methacrylate-based two stages polymer which is obtained by, in the presence of a polymer obtained by emulsion-polymerizing from 50 to 100 parts by weight of a monomer or a monomer mixture (c-1) comprising from 50 to 100% by weight of methyl methacrylate, from 0 to 50% by weight of a monomer selected from the group consisting of alkyl methacrylates other than methyl methacrylate and alkyl acrylates and from 0 to 20% by weight of a vinyl monomer copolymerizable therewith, while controlling the sum of the monomers to 100% by weight, and a solution of 0.1 g of the polymer in 100 ml of chloroform showing a specific viscosity of 0.7 or more at 30° C., adding from 0 to 50 parts by weight of a monomer or a monomer mixture (c-2) comprising from 0 to 50% by weight of methyl methacrylate, from 50 to 100% by weight of at least one monomer selected from the group consisting of alkyl methacrylates other than methyl methacrylate and alkyl acrylates and from 0 to 20% by weight of a vinyl monomer copolymerizable therewith, while controlling the sum of the monomers to 100% by weight, while controlling the sum of (c-1) and (c-2) to 100 parts by weight, and a solution of 0.1 g of the two stages polymer in 100 ml of chloroform showing a specific viscosity of 0.5 or more at 30° C.; and (D) from 1 to 20 parts by weight of calcium carbonate.

2. The vinyl chloride-based resin composition of 1 above wherein the methyl methacrylate-based two stages polymer (C) is a methyl methacrylate-based two stages polymer a solution of 0.1 g of which in 100 ml of chloroform shows a specific viscosity of 0.7 or more at 30° C.

3. The vinyl chloride-based resin composition as of 1. or 2. above wherein the graft copolymer (B) is a graft copolymer which is obtained by polymerizing, in the presence of from 70 to 95 parts by weight of a crosslinked rubber polymer comprising from 70 to 99.99% by weight of an alkyl acrylate having an alkyl group carrying form 2 to 8 carbon atoms, from 0.01 to 5% by weight of a polyfunctional monomer and from 0 to 30% by weight of a monomer copolymerizable therewith while controlling the sum of the monomers to 100% by weight, from 5 to 30 parts by weight of graft monomer component(s) comprising from 60 to 100% by weight of methyl methacrylate and from 0 to 40% by weight of at least one monomer selected from the group consisting of alkyl methacrylates other than methyl methacrylate, alkyl acrylates, unsaturated nitriles and aromatic vinyl compounds, while controlling the sum to 100 parts by weight.

4. A molded article obtained by molding the composition as claimed in any one of 1 to 3 above.

5. A window frame or a door frame obtained by molding the composition as claimed in 4 above.

Best Mode of the Invention

The vinyl chloride-based resin (A) to be used in the invention includes vinyl chloride homopolymers and copolymers containing 70% by weight or more of a repeating unit derived from a vinyl chloride. Examples of the monomers, which are contained in an amount of the residual 30% by weight or less and to be copolymerized with vinyl chloride, include vinyl acetate, vinyl propionate, vinyl butyrate, vinyl benzoate, acrylic acid, methacrylic acid, methyl acrylate, ethyl acrylate, methyl methacrylate, ethyl methacrylate, methacrylamide and other copolymerizable monoolefin monomers. Either one of these comonomers or a mixture of two or more thereof may be used.

The graft copolymer (B) to be used in the invention can be obtained by polymerizing the vinyl group-containing monomer (b-2) in the presence of the crosslinked acrylic rubber-like polymer (b-1).

The crosslinked acrylic rubber-like polymer (b-1), which is produced mainly from an alkyl acrylate and a polyfunctional monomer, is obtained by using preferably from 70 to 99.99% by weight (still preferably from 80 to 99.9% by weight) of the alkyl acrylate having an alkyl group carrying from 2 to 8 carbon atoms, preferably from 0.01 to 5% by weight (still preferably from 0.1 to 3% by weight) of the polyfunctional monomer and preferably from 0 to 30% by weight (still preferably form 0 to 20% by weight) of a monomer copolymerizable therewith. When the content of the alkyl acrylate having an alkyl group carrying from 2 to 8 carbon atoms is less than 70% by weight, there arises a problem in impact resistance or color change due to poor weatherability. When the content thereof exceeds 99.99% by weight, the content of the polyfunctional monomer becomes excessively small and thus little effect can be achieved by using it. It is also undesirable that the content of the polyfunctional monomer exceeds 5% by weight, since the impact resistance is worsened in this case.

The alkyl acrylate having an alkyl group carrying from 2 to 8 carbon atoms is a component which is used for the formation of a rubber component having an excellent weatherability and an improved impact resistance. Typical examples thereof include ethyl acrylate, propyl acrylate, isobutyl acrylate, n-butyl acrylate and 2-ethylhexyl acrylate. Either one of these alkyl acrylates or a combination of two or more thereof may be used. Among all, it is preferable to use, for example, n-butyl acrylate or 2-ethylhexyl acrylate, since a high impact resistance can be easily achieved due to the low Tg of the rubber component with the use of these alkyl acrylates.

The polyfunctional monomer as described above is a component employed as a crosslinking agent. Typical examples thereof include aromatic polyfunctional vinyl compounds (for example, divinylbenzene), dimethacrylates of polyhydric alcohols (for example, polyethylene glycol dimethacrylate, 1,3-butanediol dimethacrylate), allyl esters of unsaturated carboxylic acids (for example, allyl methacrylate, allyl acrylate), diallyl compounds and triallyl compounds (for example, diallyl phthalate, triallyl cyanurate). Among these polyfunctional monomers, those wherein at least one of the functional groups has a reactivity different from the reactivities of other functional groups are preferable, since such a polyfunctional monomer makes it possible to give a crosslinked rubber polymer even in a small amount. As preferable examples thereof, allyl methacrylate and diallyl phthalate may be cited.

Examples of the monomers copolymerizable therewith as described above include other copolymerizable monomers having a single vinyl group and conjugated diolefin compounds.

Particular examples of the other copolymerizable monomers having a single vinyl group include alkyl acrylates other than those having an alkyl group carrying from 2 to 8 carbon atoms, other acrylates, alkyl methacrylates, acrylic acid, metal acrylates, acrylamide, aromatic vinyl compounds and derivatives thereof, acrylonitrile, methacrylonitrile, vinyl ether compounds, vinyl ester compounds, vinyl halides and vinylidene halides. It is undesirable to use such a monomer in an amount exceeding 30% by weight, since the impact resistance is worsened thereby.

Particular examples of the conjugated diolefin compounds include 1,3-butadiene and isoprene. It is undesirable to use such a monomer in an amount exceeding 30% by weight, since the weatherability is worsened thereby.

Moreover, use can be made of an organosiloxane as the monomer copolymerizable therewith as described above. Namely, it is appropriate to use a composite rubber composed of a silicone rubber component obtained form an organosiloxane and an acrylate rubber component. Particular examples of the organosiloxane include cyclic siloxanes (for example, hexamethylcyclotrisiloxane, octamethylcyclotetrasiloxane, dodecamethylcyclotetrasiloxane, dodecamethylcyclohexasiloxane), alkoxysilanes (for example, trimethoxysilane, tetraethoxysilane) and methacryloxysiloxanes (for example, β-methacryloyloxyethyldimethoxysilane, γ-methacryloyloxypropylmethoxydimethylsilane). As the composite rubber composed of a silicone rubber component and an acrylate rubber component, citation may be made of a composite rubber having a chemical bond between a silicone rubber and an acrylate rubber, a composite rubber having a silicone rubber and an acrylate rubber interlocking together and a composite rubber having a silicone rubber and an acrylate rubber merely coexisting together without interlocking. It is undesirable to use the organosiloxane monomer in an amount exceeding 30% by weight, since the working properties of the vinyl chloride-based resin are sometimes worsened thereby.

The crosslinked rubber polymer may be produced by an arbitrary method without restriction. For example, it can be obtained by the conventional emulsion polymerization method.

Examples of the polymerization initiator to be used in the polymerization include organic peroxides such as ketone or aldehyde peroxides (for example, cyclohexanone peroxide), diacyl peroxides (for example acetyl peroxide), hydroperoxides (for example, t-butyl hydroperoxide, cumene hydroperoxide), dialkyl peroxides (for example, di-t-butyl peroxide), alkyl peresters (for example, t-butyl perisobutyrate) and percarbonates (for example, t-butyl peroxyisopropyl carbonate), inorganic peroxides (for example, hydrogen peroxide, potassium persulfate) and azo compounds (for example, 2,2'-azobisisobutyronitrile), though the invention is not restricted thereto. In case of using an organic peroxide and/or a inorganic peroxide from among those cited above, these compounds may be employed as heat decomposition type polymerization initiators. It is also possible to these compounds as redox type polymerization initiators by combining with a reducing agent (for example, sodium ascorbate, formaldehyde sodium sulfoxylate) optionally together with a promoter (for example, ferrous sulfate) or a chelating agent (for example, ethylenediaminetetraacetate).

The surfactant to be used in the emulsion polymerization is not particularly restricted in type. Namely, it is possible to use an anionic surfactant, a nonionic surfactant, a cationic surfactant, a combination of an anionic surfactant with a nonionic surfactant or a combination of a cationic surfactant with a nonionic surfactant. Examples of the anionic surfactant include alkali metal salts of fatty acids (for example, potassium palmitate, sodium oleate, sodium stearate), alkali metal salts, amines or ammonium salts of higher alcohol sulfates (for example, sodium dodecyl sulfate, triethanolamine dodecyl sulfate, ammonium dodecyl sulfate), alkali metal salts of alkyl benzenesulfonic acids or alkyl naphthalenesulfonic acids (for example, sodium dodecyl benzenesulfonate, sodium dodecyl naphthalenesulfonate), alkali metal salts (for example, sodium salt) of naphthalenesulfonic acid/formalin condensation product, alkali metal salts (for example, sodium salt) of dialkylsulfosuccinic acids, alkylphosphates (for example, alkylphosphonate) and polyoxyethylene sulfate salts (for example, sodium polyoxyethylene alkylphenyl ether sulfate), though the invention is not restricted thereto. Examples of the nonionic surfactant include polyoxyethylene alkyl ethers (for example, polyoxyethylene dodecyl ether, polyoxyethylene stearyl ether), polyoxyethylene alkylphenol ethers (for example, polyoxyethylene nonylphenol ether), sorbitan fatty acid esters (for example, sorbitan monostearate, sorbitan distearate, sorbitan sesquioleate), polyoxyethylene sorbitan fatty acid esters typified by polyoxyethylene sorbitan monostearate, polyoxyethylene acyl esters (for example, polyethtylene glycol monostearate, polyethylene glycol distearate), oxyethylene/oxypropylene block copolymer (molecular weight: about 2000 to about 10000) and fatty acid monoglycerides (for example, glyceryl monooleate), though the invention is not restricted thereto. Examples of the cationic surfactant include alkylamine salts (for example, dodecylamine acetate), quaternary ammonium salts (for example, dodecyltrimethylammonium chloride) and polyoxyethylenealkylamines, though the invention is not restricted thereto. In addition to these surfactants, it is also possible to use high-molecular weight surfactants.

The graft copolymer (B) to be used in the invention can be obtained by polymerizing, in the presence of from 70 to 95% by weight (preferably from 75 to 92% by weight) of the acrylate crosslinked rubber-like polymer (b-1), from 5 to 30% by weight (preferably form 8 to 25% by weight) of the vinyl monomer (b-2) while controlling the sum of the (b-1) and (b-2) to 100% by weight. It is undesirable that the amount of the acrylate crosslinked rubber-like polymer (b-1) is less than 70% by weight or exceeds 95% by weight, since an only poor impact resistant effect can be achieved in molded articles made from the resultant vinyl chloride-based resin composition.

As the vinyl monomer (b-2) to be used in the graft polymerization, use may be made of the monomers cited above in the illustration of the monemers compose the crosslinked rubber-like polymer. To enhance the impact resistant effect, it is necessary to carefully select the monomer. Among all, it is preferable to use a methyl methacrylate monomer or a monomer mixture containing methyl methacrylate as the main component. Namely, the content of methyl methacrylate in the monomer (b-2) preferably ranges from 60 to 100% by weight, still preferably from 70 to 100% by weight, while the content of one or more monomers selected from among alkyl methacrylates other than methyl methacrylate, alkyl acrylates, unsaturated nitriles and aromatic vinyl compounds (hereinafter sometimes referred to as "monomer component(s) to be polymerized together with methyl methacrylate") preferably ranges form 0 to 40% by weight, still preferably from 0 to 30% by weight. It is undesirable that the content of the methyl methacrylate in the graft monomer component (b-2) is less than 60% by weight (i.e., the content of the monomer component(s) to be polymerized together with methyl methacrylate exceeds 40% by weight), since the effect of improving the impact resistance is worsened in this case.

In the graft polymerization, the graft monomer components may be added at once as a whole followed by the polymerization. Alternatively, the whole components or a portion thereof may be continuously or intermittently added and polymerized. These graft monomer components may be mixed together as a whole. Alternatively, the polymerization may be performed in two or more stages while controlling the composition of the graft monomer components in each stage within the composition range as specified above.

The graft copolymer thus obtained is usually in a form of a latex, and a solid particle can be obtained by subjecting the latex-like graft copolymer to spray drying, salting out or acid-sedimentation, filtered, washed and dried. In the step of solidification, it is also possible to add an aging retardant or an UV absorber commonly employed in the art.

The methyl methacrylate-based two stages polymer (C) to be used in the invention is obtained by polymerizing, in the presence of a polymer obtained by polymerizing a monomer or a monomer mixture (c-1) containing methyl methacrylate as the main component, a monomer or a monomer mixture (c-2). The monomer or monomer mixture (c-1) is a monomer or a monomer mixture containing form 50 to 100% by weight (preferably form 60 to 90% by weight, still preferably form 70 to 85% by weight) of methyl methacrylate and form 0 to 50% by weight (preferably from 10 to 40% by weight and still preferably from 15 to 30% by weight) of a monomer selected from among alkyl methacrylates other than methyl methacrylate and alkyl acrylates, and from 0 to 20% by weight (preferably from 0 to 10% by weight and still preferably from 0 to 5% by weight) of a vinyl monomer copolymerizable therewith. The monomer or monomer mixture (c-2) is a monomer or a monomer mixture containing from 0 to 50% by weight (preferably form 20 to 49% by weight and still preferably from 30 to 45% by weight) of methyl methacrylate, from 50 to 100% by weight (preferably from 51 to 80% by weight and still preferably form 55 to 70% by weight) of at least one monomer selected form among alkyl methacrylates other than methyl methacrylate and alkyl acrylates, and from 0 to 20% by weight (preferably from 0 to 10% by weight, still preferably from 0 to 5% by weight) of a vinyl monomer copolymerizable therewith. By forming a polymer part made of the monomer or monomer mixture (c-2) as an external layer of the polymer formed in the first stage, the gelation of the vinyl chloride-based resin can be promoted, when the two stages polymer is added to the vinyl chloride-based resin. As a result, the effect of improving the gloss according to the invention can be remarkably enhanced.

It is undesirable that the content of methyl methacrylate in the monomer or monomer mixture (c-1) is less than 50% by weight, since the gloss is worsened in this case. In case where the content of the monomer(s) selected from among alkyl methacrylates other than methyl methacrylate and alkyl acrylates exceeds 50% by weight, the ability to promote the gelation of the vinyl chloride-based resin is weakened. In case where the content of the vinyl monomer copolymerizable therewith exceeds 20% by weight, the ability to promote the gelation of the vinyl chloride-based resin is weakened.

Particular examples of the alkyl methacrylates other than methyl methacrylate in the monomer or monomer mixture (c-1) include alkyl methacrylates having an alkyl group carrying form 2 to 8 carbon atoms such as ethyl methacrylate, propyl methacrylate, butyl methacrylate and 2-ethylhexyl methacrylate. Examples of the alkyl acrylates include alkyl acrylates having an alkyl group carrying from 1 to 8 carbon atoms such as methyl acrylate, ethyl acrylate, propyl acrylate, butyl acrylate and 2-ethylhexyl acrylate. Either one of these alkyl methacrylates other than methyl methacrylate and alkyl acrylates or a combination of two or more thereof may be used.

Particular examples of the vinyl monomer copolymerizable therewith in the monomer or monomer mixture (c-1) include aromatic vinyl compounds such as styrene and α-methyl styrene and unsaturated nitriles such as acrylonitrile. Either one of these vinyl monomers or a combination of two or more thereof may be used.

A solution which is prepared by dissolving 0.1 g of the polymer obtained by emulsion-polymerizing the monomer mixture (c-1) in 100 ml of chloroform has a specific viscosity of 0.7 or more (preferably from 0.8 to 1.9 and still preferably from 0.9 to 1.8) at 30° C. When the specific viscosity is less than 0.7, an only insufficient effect of improving the gloss can be established. When the specific viscosity exceeds 1.9, the gelation is liable to be insufficiently promoted and the processability are liable to be worsened.

Particular examples of the alkyl methacrylates other than methyl methacrylate in the monomer or monomer mixture (c-2) include alkyl methacrylates having an alkyl group carrying form 2 to 8 carbon atoms such as ethyl methacrylate, propyl methacrylate, butyl methacrylate and 2-ethylhexyl methacrylate. Examples of the alkyl acrylates include alkyl acrylates having an alkyl group carrying from 1 to 8 carbon atoms such as methyl acrylate, ethyl acrylate, propyl acrylate, butyl acrylate and 2-ethylhexyl acrylate. Either one of these alkyl methacrylates other than methyl methacrylate and alkyl acrylates or a combination of two or more thereof may be used. Among all, it is preferable to use butyl acrylate, since a polymer having a low glass transition temperature can be thus obtained.

Particular examples of the vinyl monomer copolymerizable therewith in the monomer or monomer mixture (c-2) include aromatic vinyl compounds such as styrene and α-methyl styrene and unsaturated nitriles such as acrylonitrile. Either one of these vinyl monomers or a combination of two or more thereof may be used.

A solution which is prepared by dissolving 0.1 g of the polymer obtained by polymerizing the monomer mixture (c-2) in the presence of the polymer obtained by polymerizing the monomer or monomer mixture (c-1) in 100 ml of chloroform has a specific viscosity of 0.5 or more (preferably from 0.6 to 1.9, still preferably from 0.7 to 1.8 and still preferably from 0.8 to 1.8) at 30° C. When the specific viscosity is less than 0.5, an only insufficient effect of improving the gloss can be established. When the specific viscosity exceeds 1.9, the gelation is liable to be insufficiently promoted and the processability are liable to be worsened.

To control the sum of the monomer or monomer mixture (c-1) and the monomer or monomer mixture (c-2), which are employed to produce the methyl methacrylate-based two stages polymer (C) as the processing aid of the invention, to 100 parts by weight, the monomer or monomer mixture (c-1) is used in an amount of from 50 to 100 parts by weight (preferably form 60 to 95 parts by weight and still preferably from 65 to 90 parts by weight) while the monomer or monomer mixture (c-2) is used in an amount of from 0 to 50 parts by weight (preferably from 5 to 40 parts by weight and still preferably from 10 to 35 parts by weight). In the present invention, the term "methyl methacrylate-based two stages polymer" include one stage polymer prepared from the monomer or monomer mixture (c-1) alone.

In case where the amount of the polymer prepared from the monomer or monomer mixture (c-1) (i.e., the polymer of the first stage) is less than 50 parts by weight, the gelation of the vinyl chloride-based resin is liable to be insufficiently promoted. In case where the amount of the polymer prepared from the monomer or monomer mixture (c-2) (i.e., the polymer of the second stage) exceeds 50 parts by weight, the gelation of the resultant vinyl chloride-based resin composition are liable to be insufficiently promoted.

The methyl methacrylate-based two stages polymer can be produced by the conventional emulsion polymerization method.

In the polymerizing the monomer or monomer mixture (c-1) as described above, the monomer or monomer mixture (c-1) may be added at once as a whole followed by the polymerization. Alternatively, the whole monomer or monomer mixture (c-1) or a portion thereof may be continuously or intermittently added and polymerized. The monomer or monomer mixture (c-1) may be mixed together as a whole. Alternatively, the polymerization may be performed in two or more stages while controlling the composition of the monomer components in each stage within the composition range as specified above.

In the presence of a polymer obtained by emulsion-polymerizing a monomer or a monomer mixture (c-1) when polymerizing the monomer or monomer mixture (c-2) as described above, the monomer or monomer mixture (c-2) may be added at once as a whole followed by the polymerization. Alternatively, the whole monomer or monomer mixture (c-2) or a portion thereof may be continuously or intermittently added and polymerized. The monomer or monomer mixture (c-2) may be mixed together as a whole. Alternatively, the polymerization may be performed in two or more stages while controlling the composition of the monomer components in each stage within the composition range as specified above.

The methyl methacrylate-based two stages polymer (C) in the form of a latex thus obtained is subjected to spray drying, salting out or acid-sedimentation, filtered, washed and dried, and obtained as a solid particle. In the step of solidification, it is also possible to add an aging retardant or an UV absorber commonly employed in the art.

It is also possible that the latex of the graft copolymer (B) of the invention as described above and the latex of the methyl methacrylate-based two stages polymer (C) of the invention as described above are mixed together as such and then subjected to spray drying, salting out or acid-sedimentation, filtered, washed and dried to give a mixed resin.

The vinyl chloride-based resin composition according to the invention can be obtained by blending 100 parts by weight of the vinyl chloride-based resin with from 1 to 30 parts by weight (preferably from 3 to 20 parts by weight) of the graft copolymer (B), from 0.1 to 5 parts by weight (preferably from 0.2 to 3 parts by weight) of the methyl methacrylate-based two stages polymer (C) and form 1 to 20 parts by weight (preferably form 3 to 15 parts by weight) of calcium carbonate (D). In case where the content of the graft copolymer (B) is less than 1 part by weight, no effect of improving the impact resistance can be obtained. It is undesirable that the content thereof exceeds 30 parts by weight, since the heat resistance of the molded articles thus obtained is lowered. In case where the content of the methyl methacrylate-based two stages polymer (C) is less than 0.1 part by weight, no effect of improving the gloss can be obtained. It is undesirable that the content thereof exceeds 5 parts by weight, since the impact resistance is worsened in this case. It is undesirable that the content of calcium carbonate (D) as described above is less than 1 part by weight, since the rigidity is lowered in this case. It is also undesirable that the calcium carbonate content exceeds 20 parts by weight, since the gloss and impact resistance are worsened in this case.

As the calcium carbonate, use may be made of, for example, heavy calcium carbonate, light calcium carbonate or glue calcium carbonate. To improve the affinity and dispersibility with the vinyl chloride-based resin (A), the calcium carbonate may be further surface-treated. In this case, use may be made in the treatment of fatty acids (for example, stearic acid, oleic acid, linolenic acid), organic acids (for example, resin acid, silicic acid), organic titanates (for example, isopropyltriisostearoyl titanate) or silane or phosphate coupling agents (for example, γ-chloropropyl trimethoxysilane, monooctyl phosphate). It is preferable to use calcium carbonate having an average particle diameter of from 0.2 to 5 μm, though the invention is not restricted thereto.

The vinyl chloride-based resin composition according to the invention may further contain an impact resistance-improving agent such as chlorinated polyethylene or butadiene. Processing aid that improves the peeling properties from a hot metal surface may be further added thereto. It is also possible to add a methyl methacrylate polymer having a molecular weight lower than the methyl methacrylate-based two stages polymer (C) of the invention, if needed.

The vinyl chloride-based resin composition according to the invention may be produced merely by blending the materials as described above as in the case of common vinyl chloride-based resin compositions. Namely, the production method is not particularly restricted. In the step of blending the materials, additives commonly employed in vinyl chloride-based resin compositions (for example, stabilizers, lubricant, plasticizers, coloring matters, fillers, UV absorbers, light-resistance stabilizers, flame-retardants) may be added, if needed.

Examples of the stabilizers include lead-based stabilizers (for example, tribasic leas sulfate, dibasic lead phosphite, basic lead sulfite, dibasic lead phthalate, white lead, lead silicate); tin-based stabilizers (for example, butyltin maleate, octyltin maleate, dibutyltin dimaleate, di-n-alkyltin mercaptide, dibutyltin laurylmercaptide, dioctyltin S,S'-bis-(isooctyl-mercaptoacetate)); metal soap type stabilizers derived form metals (for example, potassium, calcium, magnesium, barium, zinc, cadmium, lead) and fatty acids (for example, 2-ethylhexanoic acid, lauric acid, stearic acid, isostearic acid, hydroxystearic acid, oleic acid, ricinolic acid, linoleic acid, behenic acid); composite metal soap stabilizers (for example, Ba—Ca series, Ca—Zn series, Ba—Ca series, Ca—Mg—Sn series, Ca—Zn—Sn series, Pb—Sn series, Pb—Ba—Ca series); and epoxidized oil stabilizers (for example, epoxidized soybean oil, epoxidized linseed oil). Either one of these stabilizers or a combination of two or more thereof may be used.

The vinyl chloride-based resin composition according to the invention may be molded by various methods such as extrusion molding, calender molding, blow molding or injection molding. It is particularly preferable to employ the contour extrusion molding method.

Now, the invention will be described in greater detail by reference to the following Examples. However it is to be understood that the invention is not construed as being restricted thereto. Unless otherwise noted, all percentages are by weight and all parts are by weight too. The abbreviations used in the following Examples, Comparative Examples and Tables have each the following meaning.

| | |
|---|---|
| MMA | methyl methacrylate. |
| BMA | butyl methacrylate. |
| BA | n-butyl acrylate. |
| AMA | allyl methacrylate. |
| 2-EHA | 2-ethylhexyl acrylate. |

In the following Examples and Comparative Examples, evaluation was made as will be described in (3) hereinafter.

EXAMPLE 1

(1) Preparation of Graft Copolymer

Into a glass reactor provided with a thermometer, a stirrer, a reflux condenser, a nitrogen feeder and a feeder for a monomer and an emulsifier were fed 200 parts of distilled water, 0.5 parts of potassium stearate, 0.2 parts of sodium formaldehyde sulfoxylate, 0.01 part of ethylenediaminetetraacetic acid 2Na salt and 0.005 parts of ferrous sulfate heptahydrate and the resultant mixture was heated to 50° C. while stirring in a nitrogen gas stream. Next, a monomer mixture composed of 79.2 parts of BA, 0.8 parts of AMA and 0.1 part of cumene hydroperoxide was dropped thereinto over 4 hours. Simultaneously with the addition of the monomer mixture, a 5% by weight aqueous solution of 2 parts of potassium stearate was continuously added over 4 hours. After the completion of the addition of the monomer mixture, the resultant mixture was stirred for 1.5 hours. Then 17 parts of MMA and 3 parts of BA, which were employed as the graft monomer components, and 0.01 part of cumene hydroperoxide were continuously added thereto over 1 hours. After the completion of the addition, 0.01 part of cumene hydroperoxide was added and the obtained mixture was stirred for additional 2 hours to thereby complete the polymerization. The conversion ratio was 99.8%. The graft copolymer latex thus obtained was salted out from an aqueous solution of calcium chloride, heated and then dehydrated/dried to thereby give a white powdery resin.

(2) Preparation of Methyl Methacrylate-Based Two Stages Polymer

Into a glass reactor provided with a thermometer, a stirrer, a reflux condenser, a nitrogen feeder and a feeder for a monomer were fed 200 parts of distilled water and 0.7 parts of sodium dioctylsuccinate. After eliminating oxygen in the space and water in the reactor by passing nitrogen through the liquid phase, the contents were heated to 70° C. while stirring. Next, a monomer mixture composed of 70 parts of MMA and 10 parts of BA was added at once to the reactor. Subsequently, 0.01 part of potassium persulfate was added and stirring was continued for 1 hour to thereby substantially complete the polymerization. A white powdery resin was obtained from the latex in this step and the specific viscosity of the resin was measured. Table 1 shows the result. Following the first stage polymerization as described above, a second stage monomer mixture composed of 6 parts of MMA and 14 parts of BA was dropped continuously over 40 minutes. After the completion of the addition, the contents were maintained at 70° C. for 90 minutes to thereby complete the polymerization. The ratio of the conversion into the polymer was 99.4%. The methyl methacrylate-based two stages polymer latex thus obtained was salted out from an aqueous solution of calcium chloride, heated and then dehydrated/dried to thereby give a white powdery resin.

0.1 g of the methyl methacrylate-based two stages polymer thus obtained was dissolved in 100 ml of chloroform and the specific viscosity ($\eta_{sp}$) was measured at 30° C. Table 1 shows the result.

(3) Evaluation (3-1) Evaluation of Impact Resistance 100 parts of a vinyl chloride resin (Kanevinyl S-1001 manufactured by Kanegafuchi Chemical Industry Co., Ltd.; average degree of polymerization: 1000), 4.5 parts of a one-pack lead stabilizer (LGC3203 manufactured by ACROS), 4.5 parts of titanium oxide, 8 parts of calcium carbonate, 7 parts of the graft copolymer and 0.5 parts of the methyl methacrylate-based two stages polymer were blended in a Henschel mixer to give a powder compound. Then a window frame was produced therefrom by the extrusion molding method under the following molding conditions.

Molding machine: 65 mm Parallel Twin-Screw Extruder manufactured by Batenfeld.
Molding temperature: C1/C2/C3/C4/AD/D1/D2/D3/D4/D5: 175/180/180/175/185/202/202/206/202/200 (° C.).

| Screw speed: | 24 rpm. |
|---|---|
| Output: | 110 kg/h. |

An impact resistance test piece was prepared from the extrusion-molded window frame thus obtained and the Charpy strength was measured in accordance with JIS K 7111.

(3-2) Evaluation of Gloss

The gloss (60° spacular gloss) of the contour extrusion-molded window frame thus obtained was measured in accordance with JIS K 7105.
Table 1 shows the results.

EXAMPLE 2

(1) Preparation of Graft Copolymer

A graft copolymer was prepared as in Example 1.

(2) Preparation of Methyl Methacrylate-Based Two Stages Polymer

Into a glass reactor provided with a thermometer, a stirrer, a reflux condenser, a nitrogen feeder and a feeder for a monomer were fed 200 parts of distilled water and 0.7 parts of sodium dioctylsuccinate. After eliminating oxygen in the space and water in the reactor by passing nitrogen through the liquid phase, the contents were heated to 70° C. while stirring. Next, a monomer mixture composed of 70 parts of MMA and 10 parts of BA was added at once to the reactor. Subsequently, 0.01 part of potassium persulfate was added and stirring was continued for 1 hour to thereby substantially complete the polymerization. A white powdery resin was obtained from the latex in this step and the specific viscosity of the resin was measured. Table 1 shows the result. Following the first stage polymerization as described above, a second stage monomer mixture composed of 6 parts of MMA and 14 parts of BA was dropped continuously over 40 minutes. After the completion of the addition, the contents were maintained at 70° C. for 90 minutes to thereby complete the polymerization. The ratio of the conversion into the polymer was 99.4%. The methyl methacrylate-based two stages polymer latex thus obtained was salted out from an aqueous solution of calcium chloride, heated and then dehydrated/dried to thereby give a white powdery resin.

0.1 g of the methyl methacrylate-based two stages polymer thus obtained was dissolved in 100 ml of chloroform and the specific viscosity ($\eta_{sp}$) was measured at 30° C. Table 1 shows the result. By using the graft copolymer and the methyl methacrylate-based two stages polymer thus obtained, the Charpy strength and gloss were measured as in Example 1. Table 1 shows the results.

EXAMPLE 3

A graft copolymer and a methyl methacrylate-based two stages polymer were prepared as in Example 1 but 0.05 parts of potassium persulfate was added in the preparation of the methyl methacrylate-based two stages polymer. Then evaluation was made in the same manner. Table 1 shows the results.

EXAMPLE 4

A graft copolymer and a methyl methacrylate-based two stages polymer were prepared as in Example 1 but 0.001 part of potassium persulfate was added in the preparation of the methyl methacrylate-based two stages polymer. Then evaluation was made in the same manner. Table 1 shows the results.

EXAMPLE 5

A graft copolymer and a methyl methacrylate-based two stages polymer were prepared as in Example 1 but 0.001 part of potassium persulfate was first added and then 0.001 part of potassium persulfate was added before the second stage polymerization in the preparation of the methyl methacrylate-based two stages polymer. Then evaluation was made in the same manner. Table 1 shows the results.

EXAMPLE 6

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.05 parts of sodium dodecyl sulfate and the resultant mixture was heated to 50° C. while stirring in a nitrogen gas stream. Next, a mixture composed of 7.15 parts of BA, 1.3 parts of 2-EHA, 0.05 parts of AMA and 0.01 part of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were fed thereinto. After stirring for 1 hour, a monomer mixture composed of 64.35 parts of BA, 11.7 parts of 2-EHA, 0.45 parts of AMA and 0.1 part of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.7%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.7%). To this rubber-like polymer latex were continuously added, as the graft monomer components, 13 parts of MMA and 2 parts of BA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 98.0%. The graft copolymer latex thus obtained was salted out from an aqueous solution of calcium chloride, heated and then dehydrated/dried to thereby give a white resin powder.

(2) Preparation of Methyl Methacrylate-Based Two Stages Polymer

A methyl methacrylate-based two stages polymer was prepared as in Example (4).

By using the graft copolymer and the methyl methacrylate-based two stages polymer thus obtained, Charpy strength and gloss were measured as in Example 1. Table 1 shows the results.

EXAMPLE 7

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.1 part of sodium dodecyl sulfate and the resultant mixture was heated to 50° C. while stirring in a nitrogen gas stream. Next, a mixture composed of 13 parts of 2-EHA, 0.1 part of AMA and 0.02 part of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were fed thereinto. After stirring for 1 hour, a monomer mixture composed of 71.4 parts of BA, 0.5 parts of AMA and 0.09 part of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.5%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.3%). To this rubber-like polymer latex were continuously added, as the graft monomer components, 13 parts of MMA and 2 parts of BA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 98.2%. The graft copolymer latex thus obtained was salted out from an aqueous solution of calcium chloride, heated and then dehydrated/dried to thereby give a white resin powder.

(2) Preparation of Methyl Methacrylate-Based Two Stages Polymer

A methyl methacrylate-based two stages polymer was prepared as in Example (4).

By using the graft copolymer and the methyl methacrylate-based two stages polymer thus obtained, Charpy strength and gloss were measured as in Example 1. Table 2 shows the results.

EXAMPLE 8

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.2 parts of sodium dodecyl sulfate and the resultant mixture was heated to 50° C. while stirring in a nitrogen gas stream. Next, a mixture composed of 25 parts of 2-EHA, 0.2 parts of AMA and 0.04 part of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were fed thereinto. After stirring for 1 hour, a monomer mixture composed of 59.5 parts of BA, 0.3 parts of AMA and 0.08 part of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.8%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.4%). To this rubber-like polymer latex were continuously added, as the graft monomer components, 13 parts of MMA and 2 parts of BA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 98.0%. The graft copolymer latex thus obtained was salted out from an aqueous solution of calcium chloride, heated and then dehydrated/dried to thereby give a white resin powder.

(2) Preparation of Methyl Methacrylate-Based Two Stages Polymer

A methyl methacrylate-based two stages polymer was prepared as in Example (4).

By using the graft copolymer and the methyl methacrylate-based two stages polymer thus obtained, Charpy strength and gloss were measured as in Example 1. Table 2 shows the results.

Comparative Example 1

A graft copolymer and a methyl methacrylate-based two stages polymer were prepared as in Example 1 but 0.12 parts of potassium persulfate was added in the preparation of the methyl methacrylate-based two stages polymer. Then evaluation was made in the same manner. Table 2 shows the results.

Comparative Example 2

A graft copolymer and a methyl methacrylate-based two stages polymer were prepared as in Example 1 but 0.08 parts of potassium persulfate was added in the preparation of the methyl methacrylate-based two stages polymer. Then evaluation was made in the same manner. Table 2 shows the results.

Comparative Example 3

A graft copolymer and a methyl methacrylate-based two stages polymer were prepared as in Example 1 but 0.03 parts of potassium persulfate was added in the preparation of the methyl methacrylate-based two stages polymer. Then evaluation was made in the same manner. Table 2 shows the results.

Comparative Example 4

A graft copolymer and a methyl methacrylate-based two stages polymer were prepared as in Example 1 except that, in the preparation of the methyl methacrylate-based two stages polymer, a monomer mixture composed of 35 parts of MMA and 5 parts of BA was added at once to thereby complete the polymerization and then another monomer mixture composed of 18 parts of MMA and 42 parts of BA was dropped continuously. Then evaluation was made in the same manner. Table 2 shows the results.

TABLE 1

| | Composition (parts) | | | | | Evaluation result | | | |
|---|---|---|---|---|---|---|---|---|---|
| | Graft copolymer (B) | | MMA-based two stages polymer (C) | | | Specific viscosity of stage 1 polymer (c-1) | Specific viscosity of MMA-based two stages polymer (C) | Charpy strength (KJ/m$^2$) | Gloss (%) |
| No. | Rubber-like polymer (b-1) | Vinyl monomer (b-2) | Stage 1 composition | Stage 2 composition | Total composition | | | | |
| Ex. 1 | BA (79.2) AMA (0.8) | MMA (17) BA (3) | MMA (70) BA (10) | MMA (6) BA (14) | MMA (76) BA (24) | 0.80 | 0.76 | 99 | 63 |
| Ex. 2 | BA (79.2) AMA (0.8) | MMA (17) BA (3) | MMA (70) BA (10) | MMA (6) BA (14) | MMA (76) BA (24) | 0.79 | 0.54 | 104 | 64 |
| Ex. 3 | BA (79.2) AMA (0.8) | MMA (17) BA (3) | MMA (70) BA (10) | MMA (6) BA (14) | MMA (76) BA (24) | 0.95 | 0.93 | 89 | 66 |
| Ex. 4 | BA (79.2) AMA (0.8) | MMA (17) BA (3) | MMA (70) BA (10) | MMA (6) BA (14) | MMA (76) BA (24) | 1.10 | 1.06 | 96 | 61 |
| Ex. 5 | BA (79.2) AMA (0.8) | MMA (17) BA (3) | MMA (70) BA (10) | MMA (6) BA (14) | MMA (76) BA (24) | 1.08 | 0.88 | 99 | 62 |
| Ex. 6 | BA (71.5) 2-EHA (13) AMA (0.5) | MMA (13) BA (2) | MMA (70) BA (10) | MMA (6) BA (14) | MMA (76) BA (24) | 1.10 | 1.06 | 110 | 60 |

TABLE 2

| | Composition (parts) | | | | | Evaluation result | | | |
|---|---|---|---|---|---|---|---|---|---|
| | Graft copolymer (B) | | MMA-based two stages polymer (C) | | | Specific viscosity of stage 1 polymer (c-1) | Specific viscosity of MMA-based two stages polymer (C) | Charpy strength (KJ/m$^2$) | Gloss (%) |
| No. | Rubber-like polymer (b-1) | Vinyl monomer (b-2) | Stage 1 composition | Stage 2 composition | Total composition | | | | |
| Ex. 7 | Stage 1 2-EHA (13) AMA (0.1) Stage 2 BA (71.4) AMA (0.5) | MMA (13) BA (2) | MMA (70) BA (10) | MMA (6) BA (14) | MMA (76) BA (24) | 1.10 | 1.06 | 115 | 59 |
| Ex. 8 | Stage 1 2-EHA (25) AMA (0.2) Stage 2 BA (59.5) AMA (0.3) | MMA (13) BA (2) | MMA (70) BA (10) | MMA (6) BA (14) | MMA (76) BA (24) | 1.10 | 1.06 | 117 | 60 |
| C. Ex. 1 | BA (79.2) AMA (0.8) | MMA (17) BA (3) | MMA (70) BA (10) | MMA (6) BA (14) | MMA (76) BA (24) | 0.35 | 0.33 | 95 | 38 |
| C. Ex. 2 | BA (79.2) AMA (0.8) | MMA (17) BA (3) | MMA (70) BA (10) | MMA (6) BA (14) | MMA (76) BA (24) | 0.48 | 0.43 | 94 | 33 |
| C. Ex. 3 | BA (79.2) AMA (0.8) | MMA (17) BA (3) | MMA (70) BA (10) | MMA (6) BA (14) | MMA (76) BA (24) | 0.66 | 0.62 | 78 | 35 |
| C. Ex. 4 | BA (79.2) AMA (0.8) | MMA (17) BA (3) | MMA (35) BA (5) | MMA (18) BA (42) | MMA (53) BA (47) | 0.59 | 0.56 | 35 | 28 |

EXAMPLE 9

(1) Preparation of Graft Copolymer

Into a glass reactor provided with a thermometer, a stirrer, a reflux condenser, a nitrogen feeder and a feeder for a monomer and an emulsifier were fed 200 parts (by weight, the same will apply hereinafter) of distilled water, 0.5 parts of potassium stearate, 0.2 parts of sodium formaldehyde sulfoxylate, 0.01 part of ethylenediaminetetraacetic acid 2Na salt and 0.005 parts of ferrous sulfate heptahydrate and the resultant mixture was heated to 50° C. while stirring in a nitrogen gas stream. Next, a monomer mixture composed of 89 parts of BA, 1 part of AMA and 0.1 part of cumene hydroperoxide was dropped thereinto over 5 hours. Simultaneously with the addition of the monomer mixture, a 5% by weight aqueous solution of 2 parts of potassium stearate was continuously added over 5 hours. After the completion of the addition of the monomer mixture, the resultant mixture was stirred for 1.5 hours. Then 10 parts of MMA, which was employed as the graft monomer component, and 0.01 part of cumene hydroperoxide were continuously added thereto over 1 hours. After the completion of the addition, 0.01 part of cumene hydroperoxide was added and the obtained mixture was stirred for additional 2 hours to thereby complete the polymerization. The conversion ratio was 99.9%.

(2) Preparation of Methyl Methacrylate-Based Two Stages Polymer

Into a glass reactor provided with a thermometer, a stirrer, a reflux condenser, a nitrogen feeder and a feeder for a monomer were fed 200 parts of distilled water and 0.7 parts of sodium dioctylsuccinate. After eliminating oxygen in the space and water in the reactor by passing nitrogen through the liquid phase, the contents were heated to 70° C. while stirring. Next, a monomer mixture composed of 70 parts of MMA and 10 parts of BA was added at once to the reactor. Subsequently, 0.001 part of potassium persulfate was added and stirring was continued for 1 hour to thereby substantially complete the polymerization. A white powdery resin was obtained from the latex in this step and the specific viscosity of the resin was measured. Table 2 shows the result. Following the first stage polymerization as described above, a second stage monomer mixture composed of 6 parts of MMA and 14 parts of BA was dropped continuously over 40 minutes. After the completion of the addition, the contents were maintained at 70° C. for 90 minutes to thereby complete the polymerization. The ratio of the conversion into the polymer was 99.4%. A portion of this methyl methacrylate-based two stages polymer latex was collected to give a white resin powder. Then the specific viscosity of this resin was measured. Table 3 shows the results.

The graft copolymer latex and the methyl methacrylate-based two stages polymer latex thus obtained were mixed at a weight ration (in terms of solids) of 14:1, then salted out from an aqueous solution of calcium chloride, heated and then dehydrated/dried to thereby give a white powdery resin. The Charpy strength and gloss of this resin were evaluated as in Example 1. Table 3 shows the results.

EXAMPLE 10

A graft copolymer and a methyl methacrylate-based two stages polymer were prepared as in Example 9 except that, in the preparation of the methyl methacrylate-based two stages polymer, a monomer mixture composed of 60 parts of MMA and 20 parts of BMA was added at once to thereby complete the polymerization and then another monomer mixture composed of 6 parts of MMA and 14 parts of BA was dropped continuously. Then evaluation was made in the same manner. Table 3 shows the results.

EXAMPLE 11

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.05 parts of sodium dodecyl sulfate and the resultant mixture was heated to 50° C. while stirring in a nitrogen gas stream. Next, a mixture composed of 7.65 parts of BA, 1.3 parts of 2-EHA, 0.05 parts of AMA and 0.01 part of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were added thereto. After stirring for 1 hour, a monomer mixture composed of 68.85 parts of BA, 11.7 parts of 2-EHA, 0.45 parts of AMA and 0.1 part of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.7%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.4%). To this rubber-like polymer latex were continuously added, as the graft monomer components, 10 parts of MMA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 97.0%.

The graft copolymer was mixed with the methyl methacrylate-based two stages polymer latex as in Example (9) to give a white powder. Then evaluation was made in the same manner. Table 3 shows the results.

EXAMPLE 12

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.1 part of sodium dodecyl sulfate and the resultant mixture was heated to 50° C. while stirring in a nitrogen gas stream. Next, a mixture composed of 13 parts of 2-EHA, 0.1 part of AMA and 0.02 parts of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were added thereto. After stirring for 1 hour, a monomer mixture composed of 76.4 parts of BA, 0.5 parts of AMA and 0.09 parts of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.7%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.5%). To this rubber-like polymer latex were continuously added, as the graft monomer components, 10 parts of MMA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 97.1%.

The graft copolymer was mixed with the methyl methacrylate-based two stages polymer latex as in Example (9) to give a white powder. Then evaluation was made in the same manner. Table 3 shows the results.

EXAMPLE 13

(1) Preparation of Graft Copolymer

Into a glass reactor provided with a thermometer, a stirrer, a reflux condenser, a nitrogen feeder and a feeder for a monomer and an emulsifier were fed 200 parts of distilled water and 0.2 parts of sodium dodecyl sulfate and the resultant mixture was heated to 50° C. while stirring in a nitrogen gas stream. Next, a mixture composed of 25 parts of 2-EHA, 0.2 parts of AMA and 0.04 parts of cumene hydroperoxide was fed thereinto. 10 minutes thereafter, a mixture prepared by dissolving 0.2 parts of sodium formaldehyde sulfoxylate in 5 parts of distilled water and another mixture prepared by dissolving 0.01 part of ethylenediaminetetraacetic acid 2Na salt and 0.005 parts of ferrous sulfate heptahydrate in 5 parts of distilled water were added thereto. After stirring for 1 hour, a monomer mixture composed of 64.4 parts of BA, 0.4 parts of AMA and 0.08 parts of cumene hydroperoxide was dropped thereinto over 4 hours. Simultaneously with the addition of the monomer mixture, a 5% by weight aqueous solution of 1 part of sodium dodecyl sulfate was continuously added over 4 hours. After the completion of the addition of the monomer mixture, the resultant mixture was stirred for 1.5 hours. Thus, a rubber-like polymer latex (conversion ratio: 99.6%, average particle diameter: 0.17 μm) was obtained. A small portion of this rubber-like polymer latex was collected, salted out from an aqueous solution of calcium chloride and then dried. The solid product thus obtained was extracted with toluene at 23° C. for 40 hours and the gel content was measured (97.2%). To this rubber-like polymer latex were continuously added, as the graft monomer components, 10 parts of MMA and 0.01 part of cumene hydroperoxide at 50° C. over 1 hour. After the completion of the addition, 0.01 part of cumene hydroperoxide was added and the resultant mixture was stirred for additional 2 hours to thereby complete the polymerization. The conversion ratio of the graft monomer components was 97.5%.

The graft copolymer was mixed with the methyl methacrylate-based two stages polymer latex as in Example (9) to give a white powder. Then evaluation was made in the same manner. Table 3 shows the results.

Comparative Example 5

A graft copolymer and a methyl methacrylate-based two stages polymer were prepared as in Example 9 but 0.12 parts of potassium persulfate was added in the preparation of the methyl methacrylate-based two stages polymer. Then evaluation was made in the same manner. Table 3 shows the results.

Comparative Example 6

A graft copolymer and a methyl methacrylate-based two stages polymer were prepared as in Example 10 but 0.12 parts of potassium persulfate was added in the preparation of the methyl methacrylate-based two stages polymer. Then evaluation was made in the same manner. Table 3 shows the results.

TABLE 3

| | Composition (parts) | | | | | Evaluation result | | | |
| --- | --- | --- | --- | --- | --- | --- | --- | --- | --- |
| | Graft copolymer (B) | | Hard copolymer (C) | | | Specific viscosity of stage 1 polymer (c-1) | Specific viscosity of MMA-based two stages polymer (C) | Charpy strength (KJ/m$^2$) | Gloss (%) |
| No. | Rubber-like polymer (b-1) | Vinyl monomer (b-2) | Stage 1 composition | Stage 2 composition | Total composition | | | | |
| Ex. 9 | BA (89) AMA (1) | MMA (10) | MMA (70) BA (10) | MMA (6) BA (14) | MMA (76) BA (24) | 1.12 | 1.09 | 108 | 63 |
| Ex. 10 | BA (89) AMA (1) | MMA (10) | MMA (60) BMA (20) | MMA (6) BA (14) | MMA (66) BMA (20) BA (14) | 0.80 | 0.77 | 110 | 66 |
| Ex. 11 | BA (76.5) 2-EHA (13) AMA (0.5) | MMA (10) | MMA (70) BA (10) | MMA (6) BA (14) | MMA (76) BA (24) | 1.12 | 1.09 | 120 | 63 |
| Ex. 12 | Stage 1 2-EHA (13) AMA (0.1) Stage 2 BA (76.4) AMA (0.5) | MMA (10) | MMA (70) BA (10) | MMA (6) BA (14) | MMA (76) BA (24) | 1.12 | 1.09 | 129 | 62 |
| Ex. 13 | Stage 1 2-EHA (25) AMA (0.2) Stage 2 BA (64.4) AMA (0.4) | MMA (10) | MMA (70) BA (10) | MMA (6) BA (14) | MMA (76) BA (24) | 1.12 | 1.09 | 128 | 60 |
| C. Ex. 5 | BA (89) AMA (1) | MMA (10) | MMA (70) BA (10) | MMA (6) BA (14) | MMA (76) BA (24) | 0.35 | 0.33 | 95 | 38 |
| C. Ex. 6 | BA (89) AMA (1) | MMA (10) | MMA (60) BA (20) | MMA (6) BA (14) | MMA (66) BMA (20) BA (14) | 0.47 | 0.32 | 78 | 35 |

A molded article having excellent processability, weatherability, impact resistance and gloss can be obtained by using a vinyl chloride-based resin composition of the invention wherein an acrylic rubber graft copolymer is blended with a methyl methacrylate-based two stages polymer containing methyl methacrylate as the main component and calcium carbonate.

While the invention has been described in detail and with reference to specific embodiments thereof, it will be apparent to one skilled in the art that various changes and modifications can be made therein without departing from the spirit and scope thereof.

This application is based on Japanese Patent application No. 2000-098519 filed on Mar. 31, 2000, the entire contents of which are incorporated hereinto by reference.

What is claimed is:

1. A vinyl chloride-based resin composition which comprises:
   (A) 100 parts by weight of a vinyl chloride-based resin;
   (B) from 1 to 30 parts by weight of a graft copolymer which is obtained by graft-polymerizing, in the presence of from 70 to 95 parts by weight of a crosslinked acrylic polymer (b-1), from 5 to 30 parts by weight of a vinyl monomer (b-2) while controlling the sum of (b-1) and (b-2) to 100 parts by weight;
   (C) from 0.1 to 5 parts by weight of a methyl methacrylate-based two stages polymer which is obtained by adding to a first polymer obtained by emulsion-polymerizing from 50 to 100 parts by weight of a monomer or a monomer mixture (c-1) comprising from 50 to 100% by weight of methyl methacrylate, from 0 to 50% by weight of a monomer selected from among alkyl methacrylates other than methyl methacrylate and alkyl acrylates, and from 0 to 20% by weight of a vinyl monomer copolymerizable therewith, while controlling the sum of the monomers to 100% by weight, and a solution of 0.1 g of said polymer in 100 ml of chloroform showing a specific viscosity of 0.7 or more at 30° C., from 0 to 50 parts by weight of a monomer or a monomer mixture (c-2) comprising from 0 to 50% by weight of methyl methacrylate, from 50 to 100% by weight of at least one monomer selected from the group consisting of alkyl methacrylates other than methyl methacrylate and alkyl acrylates and from 0 to 20% by weight of a vinyl monomer copolymerizable therewith, while controlling the sum of the monomers to 100% by weight, while controlling the sum of (c-1) and (c-2) to 100 parts by weight, and a solution of 0.1 g of said two stages polymer in 100 ml of chloroform showing a specific viscosity of 0.5 or more at 30° C.; and
   (D) from 1 to 20 parts by weight of calcium carbonate.

2. The vinyl chloride-based resin composition according to claim 1 wherein said methyl methacrylate-based two stages polymer (C) is a methyl methacrylate-based two stages polymer a solution of 0.1 g of which in 100 ml of chloroform shows a specific viscosity of 0.7 or more at 30° C.

3. The vinyl chloride-based resin composition according to claim 1 or claim 2 wherein said graft copolymer (B) is a graft copolymer which is obtained by polymerizing, in the presence of from 70 to 95 parts by weight of said crosslinked acrylic polymer comprising from 70 to 99.99% by weight of an alkyl acrylate having an alkyl group carrying from 2 to 8 carbon atoms, from 0.01 to 5% by weight of a polyfunctional monomer and from 0 to 30% by weight of a monomer copolymerizable therewith while controlling the sum of the monomers to 100% by weight, from 5 to 30 parts by weight of graft monomer component(s) comprising from 60 to 100% by weight of methyl methacrylate and from 0 to 40% by weight of at least one monomer selected from the group consisting of alkyl methacrylates other than methyl methacrylate, alkyl acrylates, unsaturated nitrites and aromatic vinyl compounds, while controlling the sum to 100 parts by weight.

4. A molded article obtained by molding the composition according to claims 1 to 2.

5. A window frame or a door frame obtained by molding the composition according to in claim 4.

6. A molded article obtained by molding the composition according to claim 3.

* * * * *